United States Patent [19]

Raad et al.

[11] Patent Number: 4,773,518

[45] Date of Patent: Sep. 27, 1988

[54] ELECTROMAGNETIC CLUTCH

[75] Inventors: Bernard A. Raad, Rockford; John W. Oller, Jr., Belvidere, both of Ill.

[73] Assignee: Sundstrand Corporation, Rockford, Ill.

[21] Appl. No.: 16,578

[22] Filed: Feb. 19, 1987

[51] Int. Cl.[4] .............. F16D 27/01; F16D 27/09; F16D 27/10

[52] U.S. Cl. .................. 192/84 C; 192/67 R; 192/90

[58] Field of Search ............... 192/84 C, 84 A, 84 B, 192/84 PM, 90, 67 R

[56] References Cited

U.S. PATENT DOCUMENTS

| Re. 25,299 | 12/1962 | Rudisch | 192/84 R |
|---|---|---|---|
| 1,610,141 | 12/1926 | Michael | 192/84 C |
| 2,547,137 | 4/1951 | Ochtman | 192/84 C |
| 2,717,066 | 9/1955 | Malick | 192/84 C |
| 2,724,474 | 11/1955 | Hupp | 192/90 |
| 2,886,149 | 5/1959 | Baermann | 192/84 PM |
| 2,962,144 | 11/1960 | Heinemann et al. | 192/84 PM |
| 3,172,515 | 3/1965 | Wrensch | 192/90 |
| 3,331,481 | 7/1967 | Wrensch | 192/84 B |
| 3,400,797 | 9/1968 | Horn et al. | 192/84 AB |
| 3,414,100 | 12/1968 | Spencer | 192/84 C |
| 3,917,042 | 11/1975 | Summa | 192/84 A |
| 4,232,772 | 11/1980 | Brissey et al. | 192/84 C |
| 4,350,236 | 9/1982 | Stahlhuth | 192/84 C |

FOREIGN PATENT DOCUMENTS 217088  9/1941  Switzerland ............. 192/84 C

Primary Examiner—Leslie A. Braun
Assistant Examiner—David A. Testardi
Attorney, Agent, or Firm—Wood, Dalton, Phillips, Mason & Rowe

[57] ABSTRACT

An electromagnetic clutch assembly for engaging and disengaging a rotatable prime mover with a rotatable load. A first clutch element is attached to the load and mounted for rotation about an axis. A second clutch element forms part of a one-piece torque component with an armature portion remote from the second clutch element, attached to the prime mover, and mounted for axial movement and rotation about the axis. An electromagnetic device is mounted adjacent the armature portion to effect disengagement of the unitary second clutch element relative to the first clutch element.

14 Claims, 1 Drawing Sheet

ELECTROMAGNETIC CLUTCH

FIELD OF THE INVENTION

This invention generally relates to clutch assemblies and, particularly, to electromagnetic clutches for use in high speed applications.

BACKGROUND OF THE INVENTION

Conventional electromagnetic clutch assemblies often utilize opposing clutch surfaces or toothed faces which are mounted for coaxial rotation, with electromagnetic control of engagement and/or disengagement to transmit rotational driving forces therebetween. Such electromagnetic devices normally include an axially movable armature element which is connected to an axially retained prime mover to transmit torque. The elements either are resiliently or slidably movable under the control of an electromagnetic field to engage or disengage the opposing clutch elements.

One application of such eletromagnetic clutch assemblies is in aircraft electrical systems which supply electrical needs of the craft and include one or more electrical generators which are driven either directly from the aircraft engine or through some form of speed reducing gear box. In such aircraft applications, the generators may operate at high speeds which can be in excess of 12,000 RPM. For instance, the clutch assembly may be engageable and disengageable to connect and disconnect a starter generator with a torque converter. Therefore, long life and minimum wear are essential in the design and construction of the clutch assembly because of repeated engagements. In addition, the size of the clutch assembly has become of considerable importance in arriving at compact drive systems.

One of the problems in designing an electromagnetic clutch assembly having long life, minimum wear and compact dimensions revolves around the different characteristics of the components of the clutch. The opposing clutch elements, whether friction surfaces or toothed faces, must be fabricated of a material which is sufficiently ductile to have high impact resistance. On the other hand, the armature for the electromagnetic device must be capable of high level flux saturation. These contradicting requirements often result in compromises or in complex and oversized clutch design.

In other words, an alloy steel, such as vanadium permendur which is a cobalt alloy steel, can be heat treated on the order of 1,380° F. in order to obtain a high level of flux saturation, but such a heat treatment would lose the mechanical properties of the metal, such as high impact resistance. On the other hand, should the metal be heat treated on the order of 980° F. in order to obtain optimum strength properties for the metal, the fabricated component would not be a sufficiently good conductor for the magnetic flux. High strength or high impact resistance must be accomplished in the clutch elements themselves for operation at high speeds.

Because of the differing requirements for a clutch element of a high speed clutch assembly and the armature for such an assembly, heretofore, either compromises had to be made or the clutch design became complex and unduly large. Clutch assemblies wherein the magnetic flux path passed through the clutch elements themselves simply have not been applicable for high speed aircraft applications. This invention is directed to solving the above problems by providing an electromagnetic clutch assembly of a novel design to provide for long life, minimum wear, repeated engagement and compact size.

SUMMARY OF THE INVENTION

An object, therefore, of the invention is to provide a new and improved electromagnetic clutch assembly for engaging and disengaging a rotatable prime mover with a rotatable load.

In the exemplary embodiment of the invention, the clutch assembly includes a first clutch element attached to the load and mounted for rotation about an axis while being fixed axially. A second clutch element is constructed unitary with an armature portion which is remote from the second clutch element, attached to the prime mover, and mounted for axial rotation about the axis. An electromagnetic device is mounted adjacent the armature portion to affect engagement and disengagement of the unitary second clutch element relative to the first clutch element.

As disclosed herein, the clutch elements have complementarily engageable clutch teeth on opposing surfaces thereof. The electromagnetic device is mounted to effect disengagement of the clutch elements, and the unitary second clutch element and armature portion is spring biased into an axial position of engagement of the clutch elements.

Specifically, the second clutch element forms part of a one-piece torque component. The component includes the second clutch element at one end thereof, at one end of the electromagnetic device; an armature portion at the other end thereof, at an opposite end of the electromagnetic device; and a non-magnetic portion joining the second clutch element and the armature portion. The non-magnetic portion may comprise a core extending through a coil-like electromagnetic device. The one-piece torque component, including the second clutch element, the armature portion and the non-magnetic core all are of metallic means and may be joined by weld means.

Other objects, features and advantages of the invention will be apparent from the following detailed description taken in connection with the accompanying drawings.

BRIEF DESCRIPTION OF THE DRAWING

The features of this invention which are believed to be novel are set forth with particularity in the appended claims. The invention, together with its objects and the advantages thereof, may be best understood by reference to the following description taken in conjunction with the accompanying drawing, in which

DETAILED DESCRIPTION OF THE PREFERRED EMBODIMENT

Figure 1:
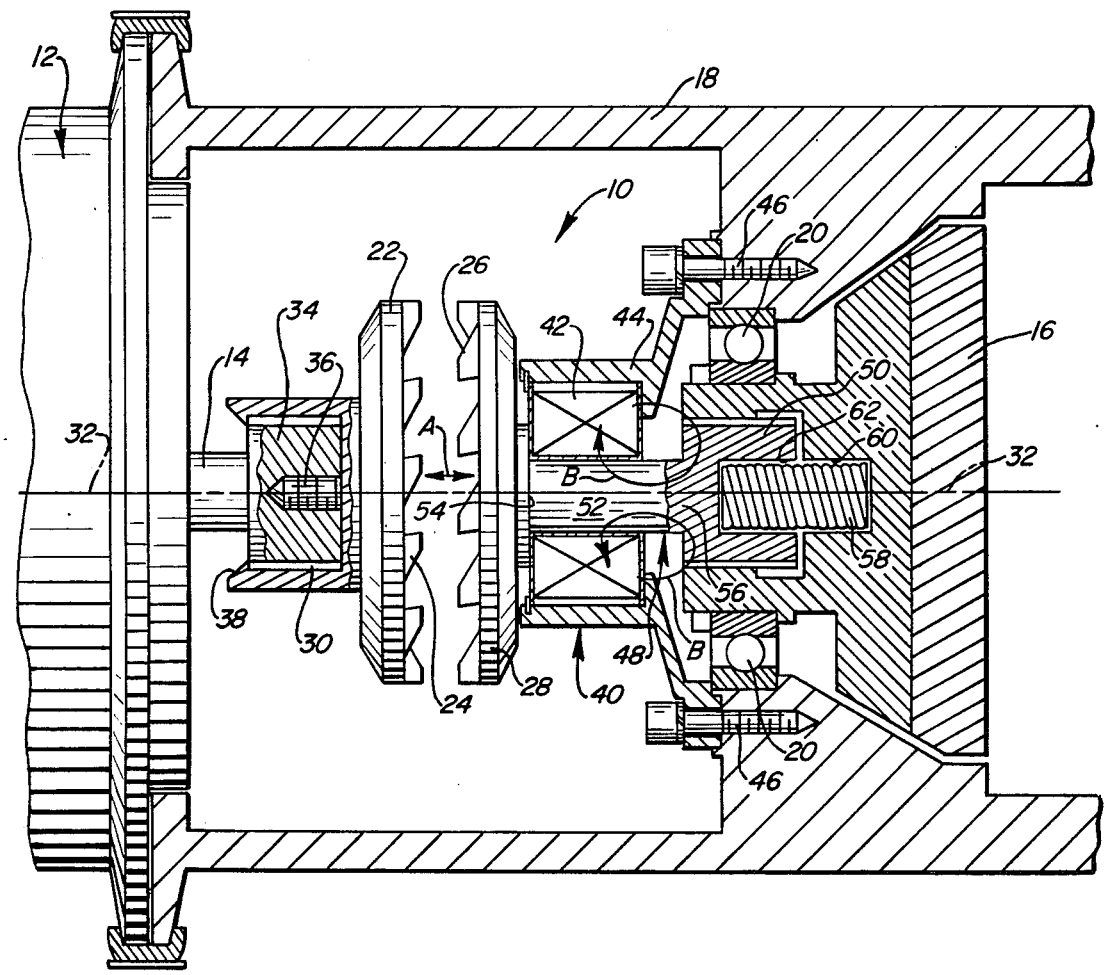
FIG. 1 is an axial section, partially in elevation, through an electromagnetic clutch assembly embodying the concepts of the invention.

Referring to the drawing in greater detail, the electromagnetic clutch assembly, generally designated 10, of the invention is mounted between a starter/generator, generally designated 12, including a starter shaft 14, and a torque converter (not shown) which includes a torque converter shaft 16. The clutch assembly is mounted within a torque converter housing 18 within which torque converter shaft 16 is journalled by bearings 20. With such applications, as in aircraft systems, shaft 14 of starter/generator 12 provides the prime moving means and may rotate at high speeds equal to or in excess of 12,000 RPM.

Electromagnetic clutch assembly 10 includes a first clutch element 22 having a toothed face 24 opposing a toothed face 26 of a second clutch element 28. The toothed faces are adapted for complementary driving engagement and disconnect disengagement in the direction of double-headed arrow "A". First clutch element 22 is splined, as at 30, to starter shaft 14 for rotation therewith about axis 32. First clutch element 22 is secured to starter spline 34 by a retainer screw 36 so that the clutch element is mounted on the starter shaft for non-axial movement. The clutch element also may be retained on starter spline 34 by snap-hook portions 38.

Electromagnetic means, generally designated 40, are operatively associated with second clutch element 28 to affect engagement and disengagement of the second clutch element with first clutch element 22. The electromagnetic means includes a solenoid coil 42 mounted within a coil housing 44 which is secured to torque converter housing 18 by retainer screws 46.

Second clutch element 28 is part of a one-piece torque component, generally designated 48, which is mounted for both rotational and axial movement relative to axis 32. Specifically, the one piece torque component includes clutch element 28 at one end thereof, at one end of coil 42, and an armature portion 50 at the other end of the torque component, at the opposite end of coil 42. Clutch element 28 and armature portion 50 are joined by a central or intermediate non-magnetic portion 52. In essence, non-magnetic portion 52 extends like a core through the center of coil 42. However, the non-magnetic portion does not influence the magnetic flux path from coil 42. Clutch element 28, armature portion 50 and non-magnetic portion 52 all may be fabricated of metallic material, with clutch element 28 and non-magnetic portion 52 joined along a weld line 54, and armature portion 50 and non-magnetic portion 52 joined along a weld line 56. The metals may be joined by electron beam welds, inertia welding or other appropriate procedures.

A coil spring 58 is sandwiched between torque converter shaft 16 and armature portion 50 of torque component 48, within opposed bores 60 and 62, respectively. Therefore, the entire one-piece torque component 48, including clutch element 28, is spring loaded and biased toward engaged condition with first clutch element 22. Upon energization of solenoid coil 42, a magnetic flux path is created through armature portion 50, as indicated generally by arrows "B". Energization of the solenoid coil causes the one-piece torque component, including clutch element 28, to move toward its disengaged condition, as shown in the Figure, against the biasing of spring 58. The engagement process is repeated by de-energizing solenoid coil 42 to allow coil spring 58 to move clutch element 28 back into engagement with first clutch element 22.

It immediately can be seen that armature portion 50 is disposed remote from clutch element 28, and the joining intermediate non-magnetic portion 52 couples the remote elements or portions for conjoint movement. With such a design, it can be understood that clutch element 28 does not form part of the electromagnetic function of the device and, therefore, can be fabricated of a high strength material having high impact resistance which would be desirable, if not necessary, for high speed engagement and disengagement of the clutch. On the other hand, armature portion 50 can be fabricated of a material which is capable of a high level of flux saturation. In fact, both clutch elements 28 and armature portion 50 can be fabricated of identical material, such as a cobalt alloy steel (vanadium permendur) which simply is heat treated to different temperatures to achieve the different properties, as described above. Non-magnetic portion or core 52 can be fabricated of stainless steel, a nickel alloy, aluminum or the like, for joining clutch element 28 and armature portion 50 into a unitary, very compact, one-piece torque component. With such a design, the clutch assembly is provided with long life, minimum wear, repeated engagement due to the ductile nature of the clutch jaw, while providing optimum properties for both the clutch element and the armature portion. By fabricating the armature portion with a capability of high level flux saturation, the armature itself can be made smaller and more compact and, in turn, solenoid coil 42 can be made smaller and yet provide efficient moving forces. The design enables the clutch element to be disposed at one end of the coil, with the armature portion at the opposite end of the coil, remote from the clutch element, whereby the clutch element does not in any way interfere with the flux path. Non-magnetic portion or core 52 provides a strong connection between the clutch element and the armature portion, yet the non-magnetic material has no more effect on the magnetic flux path than air itself.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

We claim:

1. An electromagnetic clutch assembly for engaging and disengaging a rotatable prime mover with a rotatable load, comprising:
   a first clutch element attached to said load and mounted for rotation about an axis;
   a second clutch element unitary with an armature portion remote from the second clutch element attached to said prime mover and mounted for axial and rotational movement about said axis;
   a non-magnetic portion intermediate the second clutch element and the armature portion for joining the second clutch element and the armature portion, wherein said second clutch element, said non-magnetic portion, and said armature portion comprise a unitary component; and
   electromagnetic means mounted adjacent the armature portion to effect disengagement of the unitary second clutch element relative to the first clutch element.

2. The electromagnetic clutch assembly of claim 1 wherein said electromagnetic means are mounted to effect disengagement of the clutch elements, and said unitary second clutch element and armature portion is spring biased into an axial position of engagement of the clutch elements.

3. The electromagnetic clutch assembly of claim 1 wherein said clutch elements have complementarily engageable clutch teeth on opposing faces thereof.

4. The electromagnetic clutch assembly of claim 1 wherein said second clutch element is mounted at one end of the electromagnetic means and said unitary armature portion is mounted at an opposite end of the electromagnetic means.

5. The electromagnetic clutch assembly of claim 1 wherein said electromagnetic means comprise a coil, and said non-magnetic portion projects through the coil.

6. The electromagnetic clutch assembly of claim 1 wherein said second clutch element, said armature portion and said non-magnetic portion all are of metallic material joined by weld means.

7. An electromagnetic clutch assembly for engaging and disengaging a rotatable prime mover with a rotatable load, comprising:
 a clutch element attached to said load and having clutch teeth on an engaging face thereof, the clutch element being mounted for rotation about an axis;
 an electromagnetic coil;
 a one-piece torque component mounted for both rotational and axial movement relative to said axis and including a clutch portion having teeth on an engaging face thereof for complementary engagement with the teeth of said clutch element with the clutch portion located at one end of the electromagnetic coil, an armature portion located at an opposite end of the electromagnetic coil, and a non-magnetic portion projecting through the coil and joining the clutch portion and the armature portion;
 spring means for biasing the one-piece torque component axially toward said clutch element for engaging said clutch portion therewith; and
 whereby energization of the electromagnetic coil disengages the clutch element and the clutch portion of the torque component.

8. An electromagnetic clutch assembly, comprising:
 a clutch element mounted for rotation about an axis and fixed axially;
 a one-piece torque component mounted for both rotational and axial movement relative to said axis and including a clutch portion disposed for positive engagement with said clutch element, an armature portion, and a unitary non-magnetic portion intermediate the clutch portion and the armature portion for joining the clutch portion and the armature portion, the clutch portion being of a higher strength material than that of the armature portion; and
 electromagnetic means mounted adjacent said armature portion such that the flux path of the electromagnetic means is substantially limited to the armature portion and effective to move the clutch portion axially relative to said clutch element.

9. The electromagnetic clutch assembly of claim 8 wherein said electromagnetic means are mounted to effect disengagement of said clutch element and clutch portion, and the one-piece torque component is spring biased to move the clutch portion thereof into engagement with the clutch element upon de-energization of the electromagnetic means.

10. The electromagnetic clutch assembly of claim 8 wherein said clutch element and said clutch portion have complementarily engageable clutch teeth on opposing faces thereof.

11. The electromagnetic clutch assembly of claim 8 wherein said clutch portion is mounted at one end of the electromagnetic means and said armature portion is mounted at an opposite end of the electromagnetic means.

12. The electromagnetic clutch assembly of claim 10 wherein said electromagnetic means comprise a coil, and said non-magnetic portion projects through the coil.

13. The electromagnetic clutch assembly of claim 10 wherein said clutch portion, said armature portion and said non-magnetic portion all are of metallic material joined by weld means.

14. The electromagnetic clutch assembly of claim 8 wherein said clutch portion and said armature portion are fabricated of like metallic means heat treated to different temperatures to provide the clutch portion with high strength properties and the armature portion with high flux saturation properties.

* * * * *